United States Patent
Millner et al.

(10) Patent No.: US 10,337,076 B2
(45) Date of Patent: Jul. 2, 2019

(54) PNEUMATIC ORE CHARGING

(71) Applicant: Primetals Technologies Austria GmbH, Linz (AT)

(72) Inventors: Robert Millner, Loosdorf (AT); Jan-Friedemann Plaul, Linz (AT); Norbert Rein, Vienna (AT)

(73) Assignee: PRIMETALS TECHNOLOGIES AUSTRIA GMBH (AT)

( * ) Notice: Subject to any disclaimer, the term of this patent is extended or adjusted under 35 U.S.C. 154(b) by 299 days.

(21) Appl. No.: 15/117,374

(22) PCT Filed: Jan. 27, 2015

(86) PCT No.: PCT/EP2015/051572
§ 371 (c)(1),
(2) Date: Aug. 8, 2016

(87) PCT Pub. No.: WO2015/117861
PCT Pub. Date: Aug. 13, 2015

(65) Prior Publication Data
US 2016/0348199 A1    Dec. 1, 2016

(30) Foreign Application Priority Data
Feb. 20, 2014    (EP) .................................... 14154422

(51) Int. Cl.
*F27D 3/00*    (2006.01)
*F27D 3/18*    (2006.01)
(Continued)

(52) U.S. Cl.
CPC ........ *C21B 13/0033* (2013.01); *C21B 13/006* (2013.01); *C21B 13/0073* (2013.01);
(Continued)

(58) Field of Classification Search
CPC ............ C21B 13/0033; C21B 13/0073; C21B 13/006; C21B 2100/282; C21B 2100/64;
(Continued)

(56) References Cited

U.S. PATENT DOCUMENTS 3,767,379 A * 10/1973 Marion ..................... C01B 3/36
                                                      75/464
3,905,806 A *  9/1975 Cruse, Jr. ............... B01J 23/755
                                                      75/498
(Continued)

FOREIGN PATENT DOCUMENTS

CN    101460637 A    6/2009
EP    2 664 681 A1   11/2013
(Continued)

OTHER PUBLICATIONS

First Office Action with Search Report dated Apr. 17, 2017 in corresponding Chinese Patent Application No. 201580008030.X (with English language translation)(total 11 pages).
(Continued)

*Primary Examiner* — Anthony J Zimmer
(74) *Attorney, Agent, or Firm* — Ostrolenk Faber LLP

(57) ABSTRACT

A method for reducing metal oxide containing charge materials (1): reducing the metal oxide containing charge materials (1) in at least two fluidized bed units (RA,RE) by means of a reduction gas (2), wherein at least some of the resulting off-gas (3) is recycled and wherein the metal oxide containing charge materials (1) are conveyed into the fluidized bed unit RE by a propellant gas. Also, apparatus for carrying out the method according to the invention is disclosed.

13 Claims, 1 Drawing Sheet

(51) Int. Cl.
  *F27D 7/02* (2006.01)
  *F27D 7/06* (2006.01)
  *C21B 13/00* (2006.01)
  *F27B 15/08* (2006.01)
  *F27B 15/10* (2006.01)
  *F27B 15/14* (2006.01)
  *F27B 15/16* (2006.01)
  *F27D 17/00* (2006.01)

(52) U.S. Cl.
  CPC ............ *F27B 15/08* (2013.01); *F27B 15/10* (2013.01); *F27B 15/14* (2013.01); *F27B 15/16* (2013.01); *F27D 3/0033* (2013.01); *F27D 3/18* (2013.01); *F27D 7/02* (2013.01); *F27D 7/06* (2013.01); *F27D 17/001* (2013.01); *F27D 17/008* (2013.01); *C21B 2100/282* (2017.05); *C21B 2100/64* (2017.05); *C21B 2100/66* (2017.05); *F27D 2003/185* (2013.01); *F27D 2007/063* (2013.01); *F27M 2001/02* (2013.01); *F27M 2002/11* (2013.01); *F27M 2003/165* (2013.01); *Y02P 10/122* (2015.11); *Y02P 10/126* (2015.11); *Y02P 10/136* (2015.11); *Y02P 10/212* (2015.11)

(58) Field of Classification Search
  CPC ...... C21B 2100/66; F27B 15/14; F27B 15/16; F27B 15/10; F27B 15/08; F27M 2003/165; F27M 2001/02; F27M 2002/11; F27D 2007/063; F27D 2003/185; F27D 17/001; F27D 17/008; F27D 7/02; F27D 7/06; F27D 3/18; F27D 3/0033; Y02P 10/212; Y02P 10/126; Y02P 10/122; Y02P 10/136
  See application file for complete search history.

(56) References Cited

U.S. PATENT DOCUMENTS

| | | | | |
|---|---|---|---|---|
| 4,019,724 A * | 4/1977 | Cruse, Jr. | ............... | B01J 23/755 266/156 |
| 4,070,180 A * | 1/1978 | Waslo | ................... | B22F 1/0088 148/287 |
| 4,265,868 A * | 5/1981 | Kamody | ................... | C01B 3/34 423/418.2 |
| 4,729,786 A * | 3/1988 | Schneider | ............... | C21B 13/02 266/160 |
| 5,185,032 A * | 2/1993 | Whipp | .................... | C21B 13/14 266/172 |
| 5,238,487 A * | 8/1993 | Hauk | ...................... | C21B 13/00 75/492 |
| 5,690,717 A * | 11/1997 | Stevens | ............... | C21B 13/0033 423/439 |
| 5,804,156 A * | 9/1998 | Geiger | ................ | C21B 13/0033 423/439 |
| 5,869,018 A * | 2/1999 | Stephens, Jr. | ........ | C21B 13/0033 423/439 |
| 6,379,421 B1 * | 4/2002 | Salinas-Fernandez | ..................... | C21B 13/0046 266/156 |
| 6,454,833 B1 | 9/2002 | Nagl et al. | ...................... | 75/448 |
| 7,608,129 B2 | 10/2009 | Zendejas-Martinez | | |
| 2003/0110891 A1 * | 6/2003 | Vanderheyden | .... | C21B 13/0053 75/443 |
| 2005/0151307 A1 * | 7/2005 | Viramontes-Brown | ..................... | C21B 13/002 266/140 |
| 2008/0196549 A1 | 8/2008 | Orth et al. | | |
| 2014/0217653 A1 | 8/2014 | Millner et al. | | |
| 2015/0135899 A1 * | 5/2015 | Hauzenberger | ......... | C21B 7/002 75/446 |
| 2016/0024611 A1 * | 1/2016 | Cho | .......................... | C22B 1/16 75/436 |
| 2016/0348197 A1 * | 12/2016 | Zhu | ........................ | C21B 13/146 |
| 2016/0348198 A1 * | 12/2016 | Zhu | ........................ | C21B 13/0033 |
| 2016/0369360 A1 * | 12/2016 | Zhu | ........................ | F27B 15/003 |

FOREIGN PATENT DOCUMENTS

| | | | | |
|---|---|---|---|---|
| WO | WO 2005/116280 A1 | 12/2005 | | |
| WO | WO-2008146112 A1 * | 12/2008 | ........ | C21B 13/0073 |
| WO | WO 2013/037634 A1 | 3/2013 | | |

OTHER PUBLICATIONS

International Search Report dated Mar. 2, 2015 issued in corresponding International patent application No. PCT/EP2015/051572.

* cited by examiner

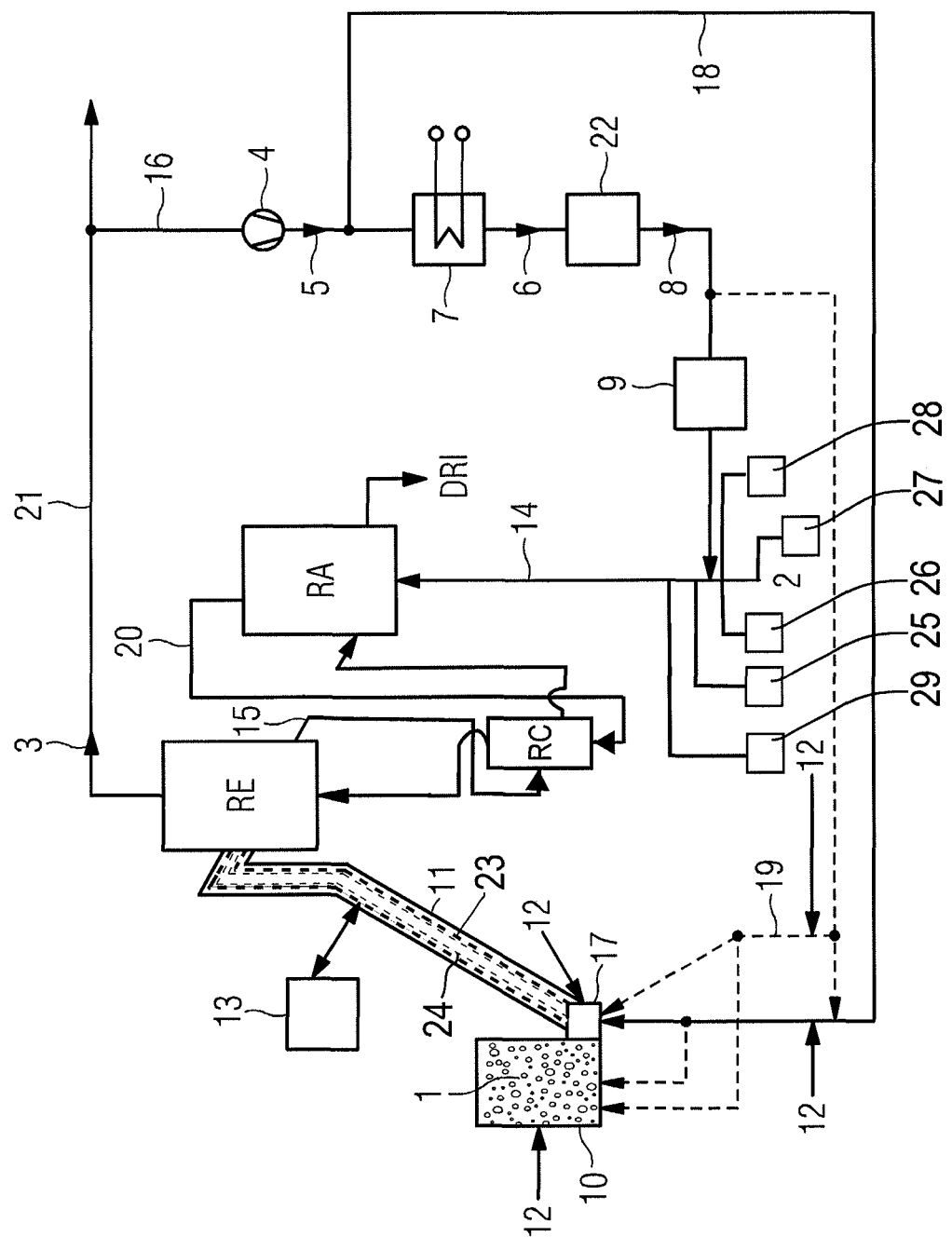

PNEUMATIC ORE CHARGING

CROSS-REFERENCE TO RELATED APPLICATIONS

The present application is a 35 U.S.C. §§ 371 national phase conversion of PCT/EP2015/051572, filed Jan. 27, 2015, which claims priority of European Patent Application No. 14154422.1, filed Feb. 10, 2014, the contents of which are incorporated by reference herein. The PCT International Application was published in the European language.

TECHNICAL FIELD

The invention relates to a method for reducing metal oxide containing charge materials in at least two fluidized bed units RA, RE by means of a reduction gas, wherein at least some of the resulting off-gas is recycled and wherein the metal oxide containing charge materials are conveyed into the fluidized bed unit RE by means of a propellant gas.

The device also relates to an apparatus for carrying out the method according to the invention.

PRIOR ART

Methods are known in which nitrogen is used as the propellant gas for pneumatically conveying metal oxide charge materials into fluidized bed units.

However, this has the disadvantage that large amounts of nitrogen are required for carrying out such methods. In a FINEX® plant, for example, 7000 standard cubic meters of nitrogen are needed per hour to convey 220 metric tons of metal oxide containing charge materials into the fluidized bed unit. This large quantity of nitrogen required results in high costs and a high degree of equipment complexity.

Another disadvantage is that the nitrogen is conveyed into the fluidized bed unit along with the metal oxide containing charge materials, resulting in dilution of the reduction gas present in the fluidized bed unit and therefore having an adverse effect on the reduction of the metal oxide containing charge materials in the fluidized bed unit.

In methods for reducing metal oxide containing charge materials in fluidized bed units, at least some of the reduction gas used in the reduction process, the so-called off-gas, is often recycled. At least some of the off-gas is compressed to produce hot recycle gas and is then cooled to a temperature required for $CO_2$ removal to produce cold recycle gas. The cold recycle gas undergoes $CO_2$-removal to produce a low-$CO_2$ product gas which is subsequently used as a reduction gas in the fluidized bed units.

It is known from the prior art to use the product gas instead of nitrogen as propellant gas for pneumatically conveying the metal oxide charge materials into the fluidized bed units. However, this results in higher capital costs for the $CO_2$ removal equipment, as this equipment additionally has to produce product gas for the pneumatic conveying.

Using the cold recycle gas as propellant gas is also known from the prior art. However, the cold recycle gas is saturated with water vapor and, if used as propellant gas, causes undesirable wet/dry transitions in the corresponding pipework. This results in condensation and bake-on in the pipes.

SUMMARY OF THE INVENTION

Technical Task

The object of the present invention is to further develop a method and an apparatus for reducing metal oxide charge materials while avoiding the disadvantages known from the prior art.

Technical Solution—Summary of the Invention

This object is achieved by a method for reducing metal oxide containing charge materials. The method includes:
using a reduction gas in at least two fluidized bed units RA, RE by means of a reduction gas fed to the fluidized bed units RA, RE and flowing through the fluidized bed units RA, RE countercurrently to the metal oxide containing charge materials,
removing as off-gas from the fluidized bed unit RE the reduction gas used during reduction of the metal oxide containing charge materials in the at least two fluidized bed units RA, RE,
compressing at least some of the off-gas in at least one recycle gas compressor to produce hot recycle gas and then cooling the hot recycle gas in at least one aftercooler to produce cold recycle gas,
at least partially removing $CO_2$ from the cold recycle gas to produce product gas,
admixing the product gas with the reduction gas, possibly after pre-heating in a heating device,
conveying the metal oxide containing charge materials by means of a propellant gas from at least one delivery tank via a pipe line into the fluidized bed unit RE, wherein the propellant gas comprises at least some of the hot recycle gas.

The reduction gas is first fed to the fluidized bed unit RA. The reduction gas flows through RA and is then introduced into the fluidized bed unit RE. After the reduction gas has flowed through unit RE, the used reduction gas is extracted therefrom as off-gas. At least some of the metal oxide containing charge materials present in RA and RE are reduced to produce metallic iron. The metal oxide containing charge materials are first charged into the fluidized bed unit RE countercurrently to the reduction gas. The metal oxide containing charge materials are heated by means of the reduction gas flowing through RE and at least partially reduced. The metal oxide containing charge materials are then introduced into RA where they are completely or partially reduced to produce metallic iron or more precisely DRI (Direct Reduced Iron) by means of the reduction gas. At least some of the off-gas is compressed to produce hot recycle gas, preferably at a temperature of between 110° C. and 130° C., and then cooled to produce cold recycle gas. The cold recycle gas undergoes $CO_2$ removal to obtain the low-$CO_2$ product gas. Possibly after pre-heating, the product gas is admixed with the reduction gas prior to being introduced into the fluidized bed unit RA.

According to the invention, the metal oxide containing charge materials are conveyed pneumatically from the delivery tank via a pipe line into the fluidized bed unit RE by means of the propellant gas which contains at least some of the hot recycle gas.

The advantages of a propellant gas that contains hot recycle gas are as follows:
Nitrogen which is used as propellant gas in methods known from the prior art can be dispensed with. This reduces the cost and complexity of the method.

When using propellant gas containing the recycle gas, the reduction gas in the fluidized bed units RA and RE is less heavily diluted or not diluted by the nitrogen. The reduction of the metal oxide containing charge materials in the fluidized bed units is therefore not adversely affected.

Product gas which is used as propellant gas in methods known from the prior art can be dispensed with. Therefore less product gas is required for carrying out the method and $CO_2$ removal cost and complexity are reduced.

If the propellant gas contains hot recycle gas, the risk of undesirable wet/dry transitions in the corresponding pipework is diminished. Condensation and bake-on in the pipes are therefore reduced or can be avoided completely.

So-called lock hopper charging systems for charging the metal oxide containing charge materials can be eliminated. This results in a reduction in the cost and complexity of carrying out the method. In addition, the known risk of back-flow associated with lock hopper charging systems is thereby prevented.

For the cooling action of the aftercoolers, smaller amounts of water are required compared to methods known from the prior art. This means that corresponding heat exchangers of the aftercoolers can be of smaller design.

Altogether, the method according to the invention provides an improved energy balance compared to the prior art.

In a preferred embodiment, the metal oxide containing charge materials are oxides of nickel, manganese, copper, lead or cobalt or mixtures thereof.

Another preferred embodiment is characterized in that the propellant gas comprises the hot recycle gas.

If the propellant gas comprises the hot recycle gas, no nitrogen, product gas or more specifically cold recycle gas is required for the method. The makes the above mentioned advantages even more marked.

In another variant of the method according to the invention, the propellant gas can include some of the product gas.

The hot recycle gas has a lower temperature limit of 70° C., preferably 100° C., with particular preference 120° C., and an upper temperature limit of 150° C., preferably 140° C., with particular preference 130° C.

This ensures that condensation of the hot recycle gas or rather wet/dry transitions in the pipework carrying the hot recycle gas are avoided.

In the method according to the invention, the product gas has a dew point of below −20° C., preferably of below −40° C., with particular preference of below −100° C.

This avoids condensation in the pipework carrying the hot recycle gas.

Another embodiment of the method according to the invention comprises before being conveyed into the fluidized bed unit RE by means of the propellant gas, the metal oxide containing charge materials are pre-heated and/or dried.

This enables the residual heat contained in the hot recycle gas to be used for the pre-heating and/or drying of the metal oxide containing charge materials.

In another embodiment of the method according to the invention, a shortfall of hot recycle gas possibly caused by a process malfunction, in particular by a malfunction of the at least one recycle gas compressor, is compensated by nitrogen in order to ensure that the metal oxide containing charge materials are conveyed into the fluidized bed unit RE.

This ensures that, even in the event of a malfunction of one or more of the recycle gas compressors, sufficient propellant gas —in this case the propellant gas contains nitrogen—is available for conveying the metal oxide containing charge materials into the fluidized bed unit RE.

In the method according to the invention, the pressure of the hot recycle gas is at least 4.5 barg, preferably at least 5 barg, with particular preference at least 5.5 barg.

This ensures that the propellant gas has sufficient pressure to overcome the pressure difference between the delivery tank and the fluidized bed unit RE in order to convey the metal oxide containing charge materials reliably. The term barg is to be understood as meaning the pressure above atmospheric pressure at the pressure measuring point.

The pressure of the hot recycle gas is between 0.5 bar and 3.0 bar, depending on the delivery head, preferably between 1.0 bar and 2.0 bar above the pressure in the fluidized bed unit RE.

This ensures that the propellant gas has sufficient pressure to overcome the pressure difference between the delivery tank and the fluidized bed unit RE in order to reliably convey the metal oxide containing charge materials. The propellant gas quantity is controlled by flow measurement and closed-loop control.

In a particularly preferred embodiment of the method according to the invention, the pipe line is designed as a double-wall tube and the space between the two tube walls is filled with a gas, in particular nitrogen, wherein the pressure of the gas is monitored for leak detection.

A pressure drop in the gas between the two tube walls indicates leakage. Pipe line leaks can therefore be found quickly, reliably and efficiently.

In another embodiment, the method according to the invention comprises a flow-based leak detection device present in at least one wall of the pipe line.

This enables pipe line leakages to be detected simply and inexpensively.

To avoid wear, in another embodiment of the method according to the invention, the pipe line has an inner wall which is lined with a ceramic compound, in particular an aluminum oxide coating.

In another embodiment of the method according to the invention, at least one additional fluidized bed unit is present which is flooded with the reduction gas introduced into the fluidized bed unit RA and flowing through the fluidized bed units RA, RE countercurrently to the metal oxide containing charge materials.

The reduction gas is first introduced into the fluidized bed unit RA. It is then extracted from RA and introduced into the additional fluidized bed unit. After the reduction gas has been extracted from the additional fluidized bed unit, it is finally introduced into the fluidized bed unit RE from which it is extracted again as off-gas.

In another embodiment of the method according to the invention, the reduction gas comes from a melter gasifier, a coal gasification plant, a coking plant, a steam reformer or a $CO_2$ reformer.

In a suitable embodiment of the method according to the invention, if the reduction gas comes from the coal gasification plant or the coking plant, it is expanded or compressed and rendered largely $CO_2$- and/or $H_2O$-free and pre-heated prior to being fed to the fluidized bed units RA, RE.

The reduction gas is therefore optimally prepared for reduction of the metal oxide charge materials.

Another object of the invention is to provide an apparatus for carrying out the method according to the invention, wherein the apparatus comprises:

- at least two fluidized bed units RA, RE for reducing metal oxide containing charge materials by means of a reduction gas, wherein the fluidized bed unit RE comprises an off-gas pipe for extracting an off-gas and the fluidized bed unit RA comprises a reduction gas feed pipe for supplying the reduction gas,
- a reduction gas pipe coming out of the fluidized bed unit RA and leading into the fluidized bed unit RE, and a material conveying pipe coming out of the fluidized bed unit RE and leading into the fluidized bed unit RA,
- a recycle gas pipe branching out from the off-gas pipe and leading into the reduction gas feed pipe, wherein at least one recycle gas compressor, at least one aftercooler, a $CO_2$ removal device and possibly a heating device are present, disposed one after the other, in the recycle gas pipe,
- a delivery tank for storing the metal oxide containing charge materials using a pneumatic conveying device and
- a first propellant gas pipe branching off between the last recycle gas compressor and the aftercooler and leading into the pneumatic conveying device and/or the delivery tank, wherein the pneumatic conveying device is connected to the fluidized bed unit RE by means of a pipe line for pneumatically conveying the metal oxide containing charge materials into the fluidized bed unit RE.

The apparatus comprises at least the fluidized bed units RA and RE which are interconnected via a reduction gas pipe. The reduction gas is extracted from the fluidized bed unit RE by means of the off-gas pipe. The reduction gas is fed to the fluidized bed unit RA by means of the reduction gas feed pipe. The metal oxide containing charge materials are conveyed from the fluidized bed unit RE into the fluidized bed unit RA by means of the material conveying pipe. The recycle gas pipe which branches off from the off-gas pipe leads into the reduction gas feed pipe. Disposed one after the other in the recycle gas pipe are at least the recycle gas compressor, at least the aftercooler and at least the $CO_2$ removal device, in particular a PSA or VPSA system. The fluidized bed unit RE is connected to the delivery tank by means of a pipe line. The metal oxide containing charge materials are stored in the delivery tank. The metal oxide containing charge materials are conveyed via the pipe line into the fluidized bed unit RE by means of the pneumatic conveying device.

The apparatus according to the invention has a second propellant gas pipe branching out from the recycle gas pipe between the $CO_2$ removal device and the fluidized bed unit RA and leading into the first propellant gas pipe and/or into the delivery tank and/or into the pneumatic conveying device.

At least some of the product gas coming from the $CO_2$ removal device can therefore be used as propellant gas.

The apparatus comprises at least one nitrogen pipe leading into the pneumatic conveying device and/or into the delivery tank and/or into the first propellant gas pipe and/or into the second propellant gas pipe.

This ensures that, even in the event of malfunction of one or more of the recycle gas compressors, sufficient propellant gas —in this case the propellant gas contains nitrogen—is available for conveying the metal oxide containing charge materials into the fluidized bed unit RE.

In another preferred embodiment of the apparatus according to the invention, the pipe line is designed as a double-wall tube having a pressure-based leak detection device. This enables pipe line leaks to be detected quickly reliably and efficiently.

Another embodiment of the apparatus according to the invention comprises a flow-based leak detection device disposed in at least one wall of the pipe line. This provides a simple and inexpensive means of detecting pipe line leaks.

Another embodiment of the apparatus according to the invention is characterized in that the pipework is protected from wear by means of a ceramic compound applied to an inner wall of the pipework, in particular an aluminum oxide coating.

In one embodiment, the apparatus according to the invention comprises at least one additional fluidized bed unit via which the reduction gas pipe and the material conveying pipe are run. The reduction gas is first introduced into the fluidized bed unit RA. It is then extracted from RA and introduced into the additional fluidized bed unit. After the reduction gas has been extracted from the additional fluidized bed unit, it is finally introduced into the fluidized bed unit RE from which it is extracted again as off-gas.

In another embodiment of the apparatus according to the invention, the reduction gas feed pipe comes from a melter gasifier, a coal gasification plant, a coking plant, a steam reformer or a $CO_2$ reformer.

In the event that the reduction gas feed pipe comes from the coal gasification plant or the coking plant, an expansion turbine or a compressor and devices for removing $CO_2$ and/or water are disposed in the reduction gas feed pipe.

The reduction gas is therefore optimally prepared for reducing the metal oxide containing charge materials.

SUMMARY OF THE DRAWINGS

The drawing schematically illustrates an example of a method according to the invention and an apparatus according to the invention.

DESCRIPTION OF AN EMBODIMENT

The drawing schematically illustrates an example of a method and apparatus according to the invention for reducing metal oxide containing charge materials 1. The metal oxide containing charge materials 1, preferably oxides of iron, nickel, manganese, copper, lead or cobalt or mixtures thereof, are at least partially reduced or more specifically reduced to DRI (Direct Reduced Iron) by reduction gas 2 which flows through at least two or alternatively three fluidized bed units RA, RE or RA, RC and RE countercurrently to the metal oxide containing charge materials 1.

A material conveying pipe 15 emanating from the fluidized bed unit RE and leading through the fluidized bed unit RC into the fluidized bed unit RA conveys the metal oxide containing charge materials 1 from RE to RA and optionally through RC. The reduction gas 2 is first fed to the fluidized bed unit RA by a reduction gas feed pipe 14. After it has flowed through RA, the reduction gas is fed through RC to RE or directly to RE. The reduction gas 2 used in the fluidized bed units RA, RE for reducing the metal oxide containing charge materials 1 is extracted from the fluidized bed unit RE as off-gas 3 by an off-gas pipe 21.

Some of the off-gas 3 is compressed in a recycle gas compressor 4 to produce recycle gas 5. The off-gas 3 is fed to the recycle gas compressor 4 via a recycle gas pipe 16 branching out from off-gas pipe 21. The hot recycle gas 5 has a lower temperature limit of 70° C., preferably 100° C., with particular preference 110° C. and an upper temperature limit of 150° C., preferably 140° C., with particular preference 130° C. The pressure of the hot recycle gas 5 is at least 4.5 barg, preferably at least 5 barg, with particular preference at least 5.5 barg and is between 0.5 bar and 3.0 bar, depending on the delivery head, preferably between 1.0 bar and 2.0 bar above the pressure in the fluidized bed unit RE. The hot recycle gas 5 is then cooled in an aftercooler 7 to produce cold recycle gas 6. The $CO_2$ contained in the cold recycle gas 6 is at least partially removed therefrom by means of a downstream $CO_2$ removal device 22 to obtain a product gas 8. The product gas 8 obtained, which has a dew point of below −20° C., preferably of below −40° C., with particular preference of below −100° C., is subject to pre-heating in a heating device 9, after which it is admixed with the reduction gas 2.

The metal oxide containing charge materials 1 are conveyed from a delivery tank 10 for storing the metal oxide containing charge materials 1 into the fluidized bed unit RE by a propellant gas. For this purpose, the propellant gas is fed to the delivery tank 10 and/or a pneumatic conveying device 17 by a first propellant gas pipe 18 branching out from the recycle gas pipe 16 between the recycle gas compressor 4 and the aftercooler 7 and leading into the pneumatic conveying device 17 and/or the delivery tank 10. The pneumatic conveying device 17 is connected to the fluidized bed unit RE by means of a pipe line 11 pneumatically conveying the metal oxide containing charge materials 1 into the fluidized bed unit RE.

Prior to the metal oxide containing charge materials 1 being conveyed into the fluidized bed unit RE, the metal oxide containing charge materials 1 are pre-heated and/or dried by means of the propellant gas. The propellant gas comprises at least some of the hot recycle gas 5. In addition, the propellant gas can also comprise some of the product gas 8. The propellant gas can also consists solely of the hot recycle gas 5. A shortfall of the hot recycle gas 5 caused by a process malfunction, in particular by a malfunction of the recycle gas compressor 4, is compensated by nitrogen 12. For this purpose, the apparatus comprises a nitrogen pipe leading into the pneumatic conveying device 17 and/or into the delivery tank 10 and/or into the first propellant gas pipe 18 and/or a second propellant gas pipe 19.

This ensures that the metal oxide containing charge materials 1 are conveyed into the fluidized bed unit RE even in the event of a malfunction. The second propellant gas pipe 19 branches off from the recycle gas pipe 16 between the $CO_2$ removal device 22 and the fluidized bed unit RA and leads into the first propellant gas pipe 18 and/or into the delivery tank 10 and/or into the pneumatic conveying device 17. The product gas 8 can therefore also be used as propellant gas.

The pipe line 11 is designed as a double-wall tube 23, wherein the space 32 between the two tube walls is filled with a gas, in particular with nitrogen 12. The pressure of the gas is monitored at 13 to detect leaks in the pipe line 11.

Alternatively, a flow-based leak detection device at 13 can be used. The pipe line 11 has an inner wall which is lined with a ceramic compound 24, in particular an aluminum oxide coating, to avoid wear. In an embodiment of the method according to the invention and of the apparatus according to the invention as shown in FIG. 1, at least one additional fluidized bed unit RC is present which is flooded with the reduction gas 2 introduced into the fluidized bed unit RA and flowing through the fluidized bed units RA, RE countercurrently to the metal oxide containing charge materials 1.

The reduction gas 2 is first introduced into the fluidized bed unit RA. It is then extracted from RA and introduced into the additional fluidized bed unit RC. After the reduction gas 2 has been extracted from the additional fluidized bed unit RC, it is finally introduced into the fluidized bed unit RE from which it is extracted again as off-gas. The reduction gas 2 to line 14 comes from a melter gasifier 25, a coal gasification plant 26, a coking plant 27, a steam reformer 28 or a $CO_2$ reformer 29. If the reduction gas 2 comes from the coal gasification plant 26 or the coking plant 27, it is expanded or compressed and rendered largely $CO_2$- and/or $H_2O$-free and pre-heated prior to being fed to the fluidized bed units RA, RC and RE.

Although the invention has been illustrated and described in detail by the preferred exemplary embodiment, the invention is not limited by the example disclosed, and other variations may be inferred therefrom by those skilled in the art without departing from the scope of protection sought for the invention.

LIST OF REFERENCE CHARACTERS

1 metal oxide containing charge materials
2 reduction gas
3 off-gas
4 recycle gas compressor
5 hot recycle gas
6 cold recycle gas
7 aftercooler
8 product gas
9 heating device
10 delivery tank
11 pipe line
12 nitrogen
13 leak detection device
14 reduction gas pipe
15 material conveying pipe
16 recycle gas pipe
17 pneumatic conveying device
18 first propellant gas pipe
19 second propellant gas pipe
20 reduction gas pipe
21 off-gas pipe
22 $CO_2$ removal device

The invention claimed is:

1. A method for reducing metal oxide containing charge materials, comprising:
   reducing the metal oxide containing charge materials with a reduction gas in at least a first and a second fluidized bed units, and flowing the reduction gas through the fluidized bed units countercurrently to the metal oxide containing charge materials;
   removing as off-gas from the first fluidized bed unit the reduction gas used during reduction of the metal oxide containing charge materials in the at least two fluidized bed units;
   compressing at least some of the off-gas in at least one recycle gas compressor to produce hot recycle gas, and then cooling the hot recycle gas in at least one aftercooler to produce cold recycle gas;
   at least partially removing $CO_2$ from the cold recycle gas to produce product gas;
   admixing the product gas with the reduction gas;

optionally, after pre-heating in a heating device, conveying the metal oxide containing charge materials by a propellant gas from at least one delivery tank by a pipe line into the first fluidized bed unit;

wherein the propellant gas comprises at least some of the hot recycle gas;

the hot recycle gas has a lower temperature limit of 70° C. and an upper temperature limit of 150° C.;

the product gas has a dew point of below −20° C.; and the pressure of the hot recycle gas is at least 4.5 bars.

2. The method as claimed in claim 1, wherein the metal oxide containing charge materials are selected from the group consisting of oxides of each of iron, nickel, manganese, copper, lead or cobalt or mixtures thereof.

3. The method as claimed in claim 1, wherein the propellant gas comprises the hot recycle gas.

4. The method as claimed in claim 1, wherein the propellant gas comprises at least some of the product gas.

5. The method as claimed in claim 1, further comprising pre-heating and/or drying the metal oxide containing charge materials before conveying the materials into the first fluidized bed unit by means of the propellant gas.

6. The method as claimed in claim 1, wherein upon a shortfall of the hot recycle gas, compensating for the shortfall by introducing nitrogen in order to ensure the conveying of the metal oxide containing charge materials into the first fluidized bed unit.

7. The method as claimed in claim 1, further comprising the pressure of the hot recycle gas is between 0.5 bar and 3.0 bar, above the pressure in the first fluidized bed unit.

8. The method as claimed in claim 1, wherein the pipe line into the first fluidized bed unit comprises a double-wall tube, and a space between the two tube walls is filled with a gas, wherein the pressure of the gas is monitored to detect leaks.

9. The method as claimed in claim 1, wherein a flow-based leak detection device is present in at least one wall of the pipe line into the first fluidized bed unit to detect a gas leak.

10. The method as claimed in claim 1, further comprising the pipe line has an inner wall which is lined with a ceramic compound to avoid wear.

11. The method as claimed in claim 1, further comprising at least one additional fluidized bed unit, flooding the additional fluidized bed unit with a reduction gas introduced into the second fluidized bed unit and flowing the reduction gas through the three fluidized bed units countercurrently to the metal oxide containing charge materials.

12. The method as claimed in claim 1, further comprising the reduction gas comes from a melter gasifier, a coal gasification plant, a coking plant, a steam reformer or a $CO_2$ reformer.

13. The method as claimed in claim 12, further comprising 1) expanding or compressing, 2) removing $CO_2$ and/or $H_2O$ from, and 3) preheating the reduction gas before feeding to the at least first and second fluidized bed units, wherein the reduction gas comes from the coal gasification plant or from the coking plant.

* * * * *

UNITED STATES PATENT AND TRADEMARK OFFICE
CERTIFICATE OF CORRECTION

| | | |
|---|---|---|
| PATENT NO. | : 10,337,076 B2 | Page 1 of 1 |
| APPLICATION NO. | : 15/117374 | |
| DATED | : July 2, 2019 | |
| INVENTOR(S) | : Millner et al. | |

It is certified that error appears in the above-identified patent and that said Letters Patent is hereby corrected as shown below:

On the Title Page

Item (30) Foreign Application Priority Data should read:
-- Feb. 10, 2014 (EP) 14154422 --

Signed and Sealed this
Third Day of September, 2019

Andrei Iancu
*Director of the United States Patent and Trademark Office*